United States Patent [19]

Georgelos

[11] Patent Number: 5,593,747
[45] Date of Patent: *Jan. 14, 1997

[54] PUNCTURE RESISTANT HEAT SHRINKABLE FILM CONTAINING NARROW MOLECULAR WEIGHT ETHYLENE ALPHA OLEFIN

[75] Inventor: Paul N. Georgelos, Oak Park, Ill.

[73] Assignee: Viskase Corporation, Chicago, Ill.

[*] Notice: The term of this patent shall not extend beyond the expiration date of Pat. No. 5,397,613. 5

[21] Appl. No.: 394,052

[22] Filed: Feb. 24, 1995

Related U.S. Application Data

[63] Continuation-in-part of Ser. No. 163,016, Dec. 8, 1993, abandoned, which is a continuation-in-part of Ser. No. 89,914, Jul. 12, 1993, Pat. No. 5,397,613.

[51] Int. Cl.⁶ .................................................. B29D 22/00
[52] U.S. Cl. ..................... 428/36.7; 428/500; 428/516; 428/910; 428/35.9
[58] Field of Search ................................ 428/516, 500, 428/518, 520, 36.6, 36.7, 910, 35.9

[56] References Cited

U.S. PATENT DOCUMENTS

| | | |
|---|---|---|
| 4,424,243 | 1/1984 | Nishimoto et al. . |
| 4,429,079 | 1/1984 | Shibata . |
| 4,456,646 | 6/1984 | Nishimoto et al. . |
| 4,457,960 | 7/1984 | Newsome ................................ 428/35 |
| 4,837,084 | 6/1989 | Warren . |
| 4,863,769 | 9/1989 | Lustig et al. . |
| 5,183,867 | 2/1993 | Weborn . |
| 5,256,428 | 10/1993 | Lustig ..................................... 428/516 |
| 5,272,016 | 12/1993 | Ralph ...................................... 428/516 |

FOREIGN PATENT DOCUMENTS

| | | |
|---|---|---|
| 240705 | 10/1987 | European Pat. Off. . |
| 292894 | 11/1988 | European Pat. Off. . |
| 346944 | 12/1989 | European Pat. Off. . |
| 351744 | 1/1990 | European Pat. Off. . |
| 374783 | 6/1990 | European Pat. Off. . |
| 0416815 | 3/1991 | European Pat. Off. . |
| 562493 | 9/1993 | European Pat. Off. . |
| 600425 | 6/1994 | European Pat. Off. . |
| WO92/14784 | 9/1992 | WIPO . |

OTHER PUBLICATIONS

J. Schut, "Enter a New Generation of Polyolefins", Nov. 1991, pp. 15–17 in *Plastics Technology*.

"Encyclopedia of Polymer Science and Engineering" vol. 14, John Wiley & Sons 1988 pp. 465–468.

"Tafmer", Mitsui Petrochemical Industries, Ltd., 20 pages undated.

Proceedings of Future–Pak '91, Ninth International Ryder Conference on Food Packaging Innovations, Oct. 2–4, 1991, "Easy Peelable LID Material", H. Shigemoto and M. Fugi, pp. 293, 295, 297, 299–315.

European Search Report on EP 94 11 0763.

*Primary Examiner*—Paul J. Thibodeau
*Assistant Examiner*—Michael LaVilla
*Attorney, Agent, or Firm*—Roger Aceto

[57] ABSTRACT

A biaxially stretched film with very high heat shrink and puncture resistance properties, formed of an ethylene alpha olefin copolymer having a density between about 0.88–0.905 g/m³, a low melt index not exceeding about 1.5 g/min, a Mw/Mn not exceeding about 3, and having a melting point below about 102° C.

27 Claims, No Drawings

PUNCTURE RESISTANT HEAT SHRINKABLE FILM CONTAINING NARROW MOLECULAR WEIGHT ETHYLENE ALPHA OLEFIN

RELATED APPLICATIONS

This application is a continuation-in-part of prior U.S. application Ser. No. 08/163,016, which was filed in the name of Paul N. Georgelos on Dec. 8, 1993 and is now abandoned, and which is a continuation-in-part of application Ser. No. 08/089,914, which was filed in the name of Paul N. Georgelos on Jul. 12, 1993 and is now U.S. Pat. No 5,397,613.

FIELD OF THE INVENTION

This invention relates to puncture resistant, heat shrinkable film, and more particularly to such films having high puncture resistance, high biaxial heat shrink and good optical properties. The film contains ethylene alpha olefin copolymer with high molecular weight but a relatively narrow distribution of molecular weights (low Mw/Mn).

BACKGROUND OF THE INVENTION

The shrink packaging of food articles such as poultry, fresh red meat and processed meat products requires tough, puncture resistant, yet flexible film materials which are heat shrinkable. Most commonly these films are fabricated as bags into which the food articles are placed. The food article-containing bag is then evacuated and sealed either by clips or more commonly by heat sealing the bag inner surfaces together across the bag's open mouth end. The sealed, food article-containing bag is then heated, for example by hot air, infrared radiation or hot water, causing the bag to shrink in both the machine direction (MD) and the transverse direction (TD) against the contours of the contained food article or articles. For many applications the heat shrunk package must have good optical properties, either for aesthetic reasons or functional reasons or both. In some instances the film must have low haze so that the packaged article may be periodically inspected to insure continued package integrity.

For example, in commercial poultry shrink packaging operations, monolayer films formed from polyethylene or ethylene vinyl acetate polymers have been widely used. In general, polyethylenes such as linear low density polyethylene (LLDPE) and high density polyethylene (HDPE) provide relatively high puncture resistance, high tensile strength, but relatively low biaxial shrink properties. On the other hand, ethylene vinyl acetate (EVA) provides relatively high shrink and limited tensile strength/puncture resistance. In some instances blends of various polyethylenes and EVA have been used to obtain a balance of these desirable properties, but with limited success.

Monolayer films are suitable for poultry packaging. However for fresh red meat and processed meat packaging, a high degree of oxygen and moisture barrier protection is essential, so the common practice has been to use multilayer films including an oxygen barrier as a core layer between at least one inner layer and one outer layer. Oxygen barriers include vinylidene chloride copolymers such as the vinyl chloride form (saran) and the methyl acrylate form (MA saran), hydrolyzed ethylene vinyl acetate (EVOH) and nylon. The innermost layer of such multilayer films is in direct contact with the stored food and is frequently referred to as the sealing layer. This is because the most common method of sealing heat shrinkable food packages of this type is by heating the mouth edges of the self adhering inner layers together under pressure. That is, the opposite inner surfaces of the film enclosure are sealed by heat. So the inner layer must be formed of a self-adhering material which seals (but does not melt) over an elevated temperature range imparted by commercially used equipment such as impulse sealers. The most commonly used material for the inner layer is EVA, either alone or in a blend with other thermoplastic polymers such as polyethylenes. Typically this inner layer is also the thickest layer of the multilayer film. For example, in a 2.5 mil thick film the inner layer of a three layer film may comprise about 60% of this total thickness.

The outer layer of oxygen-barrier type multilayer films is often referred to as the abuse layer, because it must withstand abrasion from sliding contact with external objects during normal handling, as well as resistance to puncture from contact with external sharp articles. Outer layers are commonly formed of polyethylenes or EVA or blends thereof. Typically the outer layer of a three layer film comprise about 20–35%, the barrier layer comprises about 10–25%, and the inner layer comprises about 55–70% of the total film thickness.

It should also be recognized that since food articles such as primal and sub-primal fresh meat cuts often have sharp edges or protruding bones, the multilayer film must have good resistance to puncturing from the inside.

It has previously been indicated that whereas EVA affords high biaxial heat shrink properties, its strength properties such as tensile strength and puncture resistance are inferior to polyethylenes such as LLDPE, which unfortunately have relatively low biaxial heat shrink. These limitations have been partially overcome by the discovery of ethylene alpha olefin copolymers known as very low density polyethylene (hereinafter VLDPE), also called "ultra low density polyethylene" (ULDPE) and use of same in heat shrinkable films as for example described in Lustig et al U.S. Pat. No. 4,863,769. According to the latter, VLDPE may be used in either the aforedescribed monolayer films for non-barrier poultry shrink packaging or in the inner and/or outer layers of a multilayer oxygen barrier type film. When used in either manner, it provides substantially higher shrink than other polyethylenes such as LLDPE, yet imparts higher strength and puncture resistance than EVA. Accordingly, use of prior art types of VLDPE has permitted the practitioner to achieve biaxial heat shrink properties approaching those of EVA without sacrificing the high tensile strength/puncture resistance properties of polyethylene.

In addition to the prior art types of VLDPE, other ethylene alpha olefins are manufactured with elastomeric properties and these commercially available materials are hereinafter referred to as "prior art ethylene alpha olefin plastomers". Some of these have densities in the same range as VLDPE's but have greatly different physical properties due to differences in manufacturing processes. For example, it appears that prior art ethylene alpha olefin plastomers and VLDPE are manufactured with different catalyst systems. One manufacturer of these prior art materials is Mitsui Petrochemicals Ltd., and they sell prior art ethylene-butene plastomer copolymers under the name "Tafmer". These materials are used in blends with other thermoplastic polymers in various applications such as films to provide improved shrink, flexibility, and in some instances improved strength. However, unlike VLDPE's, these prior art ethylene alpha olefins are too weak for use as monolayer biaxially oriented heat shrinkable films in the pure component form. By way of illustration, the prior art Tafmer materials either cannot be extruded into a primary tube, or if this is accomplished cannot be expanded for biaxial orientation by the well-known double bubble method without bubble breakage.

While the prior art has improved the heat shrink and physical strength properties of biaxially stretched films (both monolayer and multilayer types) by using blends of thermoplastic polymers such as EVA, prior art VLDPE and prior art ethylene alpha olefin plastomers, there is a need for biaxially stretched films with even higher heat shrink and higher physical strength properties than heretofore available. Moreover in some instances such blending improves physical properties but adversely affects optical properties because of incompatibilities between blended resins.

One object of this invention is to provide a heat shrinkable biaxially stretched thermoplastic film with higher shrink properties than obtainable with EVA.

Another object is to provide a heat shrinkable biaxially stretched thermoplastic film with higher tensile strength properties than obtainable with prior art polyethylenes.

A further object is to provide a heat shrinkable biaxially stretched thermoplastic film with higher dynamic puncture resistance properties than obtainable with prior art polyethylenes.

A still further object is to provide a heat shrinkable biaxially stretched thermoplastic monolayer film formed of a single ethylene alpha olefin copolymer, with higher heat shrink, tensile strength and dynamic puncture resistance properties than obtainable with prior art EVA or polyethylenes.

Still another object is to provide a heat shrinkable biaxially stretched thermoplastic multilayer film of the oxygen barrier core layer type, with at least one inner or outer layer formed of an EVA-ethylene alpha olefin copolymer blend, with higher shrink, tensile strength and dynamic puncture resistance properties than obtainable with prior art EVA-polyethylene blends, yet good optical properties.

Other objects and advantages of this invention will be apparent from the ensuing disclosure and appended claims.

SUMMARY OF THE INVENTION

In accordance with the present invention there is provided a heat shrinkable, puncture resistant, biaxially stretched thermoplastic film suitable for use in fabricating bags for packaging food articles. This film comprises a polyethylene which is a linear copolymer of ethylene and higher alpha olefin containing from 4 to 8 carbon atoms, having a density between about 0.88 and about 0.905 g/cm$^3$, a melt index not exceeding about 1.5 g/10 min, a molecular weight size distribution ratio Mw/Mn below about 3, a melting point below about 102° C., a Young's Modulus of below about 850 kg/cm$^2$, and wherein the film shrinks at least about 45 percent at a temperature of about 90° C. in at least one of the machine and transverse directions. As used herein, the ethylene alpha olefins copolymers includes terpolymers of ethylene and two higher alpha olefins containing 4 to 8 carbon atoms.

This film may be a monolayer wherein the above-described ethylene alpha olefin copolymer comprises the entire composition, or it may be blended with other thermoplastic polymers. The film may also be part of a multilayer construction such as the previously described oxygen barrier core layer type, wherein the above-described ethylene alpha olefin copolymer comprises at least a portion of at least one layer on one side of the core layer.

As will be explained hereinafter in more detail and substantiated by the working examples, this film accomplishes all of the aforedescribed objects, and in fact provides additional advantages over prior art films commercially used for shrink packaging food.

DETAILED DESCRIPTION OF THE INVENTION

The ethylene alpha olefin resins used to manufacture the films of this invention may be prepared by using the traditional Ziegler-Natta heterogeneous catalyst system as for example broadly described in the aforementioned Lustig et al U.S. Pat. No. 4,863,769. It is believed that one resin which is useful in this invention, Mitsui's Tafmer A-0585, was prepared by such a catalyst system.

Alternatively, the same general type of ethylene alpha olefin resins may be prepared by a homogenous metallocene single-site catalyst system which in general produces molecular chains of more uniform length with more evenly spaced comonomer. Another result is narrower molecular weight distribution and composition. If necessary, according to the resin manufacturers a multistep polymerization process with a succession of different metallocene single-site catalysts is capable of producing virtually any desired final molecular weight distribution. It is believed that Exxon Chemical Company's EXACT® Type 3033 (formerly SLP 0633), another ethylene alpha olefin useful in the practice of this invention, was prepared in a metallocene single-site catalyst system. This general type of system is described in Welborn U.S. Pat. No. 5,183,867 (assigned to Exxon) and European Patent application publication 0 416 815 A2 to G. F. Schmidt (assigned to Dow Chemical Company) both incorporated herein by reference, to the extent pertinent.

Although the ethylene alpha olefin copolymers useful in the practice of this invention are different from previously known VLDPE copolymers, they have at least some of the VLDPE properties as broadly described in the previously referenced Lustig et al U.S. Pat. No. 4,863,769 (hereinafter "Lustig et al '769"). Whereas according to Lustig et al '769 the VLDPE may have a density up to about 0.914, the ethylene alpha olefins of this invention have densities up to about 0.905 g/cm$^3$. Likewise, according to Lustig et al '769, VLDPE materials may have densities as low as about 0.86 g/cm$^3$, whereas ethylene alpha olefins of this invention have densities as low as about 0.88 g/cm$^3$. Like previously known VLDPE materials, the ethylene alpha olefins useful in this invention may be extruded into monolayer heat shrinkable biaxially oriented films having high strength and high heat shrink. According to Lustig et al '769, this VLDPE shrink is at least about 30% at 90° C. in at least either the transverse or the machine direction. The films of this invention shrink at least about 45% in at least one of the machine and transverse directions at 90° C. Moreover as will be demonstrated, films of this invention also provide higher puncture strength than films prepared from previously known VLDPE materials.

As previously explained, films formed from the ethylene alpha olefin copolymers according to this invention have certain properties which are quite different from and nonanalogous to films containing prior art ethylene alpha olefin plastomers even though one manufacturer of both type resins, Mitsui, describes them in terms of the same tradename—Tafmer. Table A is a listing of representative prior art ethylene alpha olefin plastomers and their physical properties in the resin form.

Ethylene alpha olefin copolymers suitable for use in this invention are relatively high molecular weight, as reflected in the requirement that their melt index not exceed about 1.5 g/10 min, as measured by ASTM D-1238, condition E.

TABLE A

Prior Art Ethylene Alpha-Olefin Plastomer Physical Properties

| Type | Manufacturer | Property | Units | Value |
|---|---|---|---|---|
| A-4085 | Mitsui | Melt Index (D-1238) | g/10 min (190° C.) | 3.6 |
| | | Density (D-1505) | g/cc | 0.88 |
| | | Vicat Soften Pt. (D-1525) | °C. | 54 |
| | | Tensile Strength At Break (515 K 6301)* | kg/cm² | 270 |
| | | Elongation At Break (515 K 6301)* | % | 800 |
| | | Mw | g/mole | 108,000 |
| | | Mn | g/mole | 46,000 |
| | | Mw/Mn | none | 2.35 |
| A-4090 | Mitsui | Melt Index (D-1238) | g/10 min (190° C.) | 3.6 |
| | | Density (D-1505) | g/cc | 0.89 |
| | | Vicat Soften Pt. (D-1525) | °C. | 60 |
| | | Tensile Strength At Break (515 K 6301)* | kg/cm² | 320 |
| | | Elongation At Break (515 L 6301)* | % | 700 |
| | | Mw/Mn | none | 2.0 |
| A-1085 | Mitsui | Melt Index (D-1238) | g/10 min (190° C.) | 1.4 |
| | | Density (D-1505) | g/cc | 0.885 |
| | | Vicat Soften Pt. (D-1525) | °C. | 58 |
| | | Tensile Strength At Break (515 K 6301)* | kg/cm² | 340 |
| | | Elongation At Break (515 K 6301)* | % | 710 |
| | | Mw | g/mole | 160,000 |
| | | Mn | g/mole | 80,000 |
| | | Mw/Mn | none | 2.0 |

*A Japanese test procedure similar to ASTM D-638

Prior art VLDPE materials include those manufactured by Dow Chemical Company and Union Carbide Corporation, and Table B is a representative list along with physical properties in the resin form.

TABLE B

Prior Art VLDPE Physical Properties

| Type | Manufacturer | Property | Units | Value |
|---|---|---|---|---|
| 4001 also XU61520.01 | Dow (ethylene-octene-1 copolymer) | Melt Index D-1238 | g/10 min | 1.0 |
| | | Density D-792 | g/cc | 0.912 |
| | | Tensile Yield D-638 | psi | 1200 |
| | | Ultimate Tensile D-638 | psi | 3500 |
| | | Ult. Elongation D-638 | % | 850 |
| | | Vicat Soften Pt. D-1525 | °C. | 95 |
| | | Mw/Mn ASTM D-3593 | none | 5.1 (110,600/ 21,680) |
| 4003 | Dow (ethylene-octene-1 copolymer) | Melt Index D-1238 | g/10 min | 0.8 |
| | | Density D-792 | g/cc | 0.905 |
| | | Tensile Yield D-638 | psi | 950 |
| | | Ultimate Tensile D-638 | psi | 3200 |
| | | Ult. Elongation D-638 | % | 800 |
| | | Vicat Soften. Pt. D-1525 | °C. | 80 |
| 1137 | Union Carbide (ethylene-butene copolymer) | Melt Index D-1238 | g/10 min | 1.0 |
| | | Density D-792 | g/cc | 0.905 |
| | | Tensile Yield D-638 | psi | 2800 |
| | | Ultimate Tensile D-638 | psi | — |
| | | Ult. Elongation D-638 | % | 1720 |
| | | Vicat Soften Pt. D-1525 | °C. | 80 |
| | | Mw/Mn ASTM D-3593 | none | 4.9 125,000/ 25,700 |
| 1192 | Union Carbide (ethylene-butene-hexene terpolymer) | Melt Index D-1238 | g/10 min | 0.19 |
| | | Density D-792 | g/cc | 0.912 |
| | | Tensile Strength D-882 | psi | 7100 MD 5000 TD |
| | | Ult. Elongation D-882 | % | 400 MD 760 TD |
| | | Vicat Soften. Pt. D-1525 | °C. | low 80's reported by mfg. |
| | | Mw/Mn ASTM D-3593 | none | 12.2 196,900/ 16,080 |

Suitable ethylene alpha olefins for preparing the film of this invention include Mitsui's Tafmer A-0585 and Exxon's EXACT® 3033. The latter material was formerly designated by the manufacturer as SLP 0633, and is an ethylene-butene-hexene terpolymer. Physical properties of Tafmer A-0585, an ethylene-butene copolymer, and EXACT are set forth in Table C.

TABLE C

| Property | Unit | Value |
| --- | --- | --- |
| Tafmer A-0585 Physical Properties | | |
| Melt Index (D-1238) | g/10 min (190° C.) | 0.5 |
| Density (D-1505) | g/cc | 0.88 |
| Melting Point | °C. | 67 |
| Vicat Soften Pt. (D-1525) | °C. | 62 |
| Tensile Strength At Break (515 K 6301) | kg/cm² | 400 |
| Elongation At Break (515K 6301) | % | 650 |
| Mw | g/mole | 190,000 |
| Mn | g/mole | 92,600 |
| Mw/Mn | none | about 2 |
| Exact 3033 Physical Properties | | |
| Melt Index (D-1238) | g/10 min (190° C.) | 1.2 |
| Density (D-1505) | g/cc | 0.900* |
| Melting Point | °C. | 94 |
| Vicat Soften Pt. (D-1525) | °C. | 75–83° C. |
| Tensile Strength At Break (D-882) | kg/cm² | 9800 MD 9020 TD |
| Mw | g/mole | 92,000 |
| Mn | g/mole | 50,000 |
| Mw/Mn | none | 1.8 |

*The manufacturer Exxon has characterized its EXACT type ethylene alpha olefins of at least 0.900 density as VLDPE.

Molecular Weight/Size Distribution

Most commercial polymeric materials are polydisperse. This means they have a distribution of molecules with varying chain length, which distribution may be characterized by numerical averages.

Ethylene alpha-olefin copolymers may be partially characterized by their weight average molecular weight (Mw) which is determined by multiplying the weight of each chain length of a given number of repeat units by the number of such chain lengths present, and dividing by the total weight of chains. Mw is more sensitive to the longer chain length, i.e., larger molecules. Ethylene alpha-olefin copolymers may also be partially characterized by a number average molecular weight (Mn), which is derived from the total number of polymer molecules of each chain length present divided by the total number of chains present. Mn is particularly sensitive to shorter chain lengths, i.e., smaller molecules. When both Mw and Mn are known, they can be used to characterize the shape of the molecular weight distribution curve for the copolymer, i.e. the number of polymer chains in a molecular weight interval as the ordinate and the molecular weight as the abscissa. Qualitatively, a high Mw/Mn connotes a wide distribution of molecular weights whereas a low Mw/Mn connotes narrow distribution. Mw/Mn can be measured by several different techniques, but as used herein the gel permeation chromatography ("GPC") procedure outlined in ASTM D-3593-80 is used.

In general, relatively narrow Mw/Mn distribution (and low ratio) permits sharper control of physical properties and superior optical properties, i.e. relatively high gloss and low haze. However, relatively low Mw/Mn ratio value prior art polymers are also difficult to process. More particularly, the specific prior art ethylene alpha-olefin plastomers known to applicant are characterized by relatively narrow molecular weight distribution and Mw/Mn values below about 3. They are relatively difficult to process into films by melt extrusion. Applicant has been unable to prepare biaxially oriented heat-shrinkable film from these materials such as the aforedescribed Tafmer A-1085 and Tafmer A-4085.

In contrast, although the ethylene alpha olefins useful in the practice of this invention have relatively low Mw/Mn values below 3, yet they can be used to form pure component biaxially stretched, heat shrinkable film.

In general, previously known VLDPE copolymers available in commercial quantities have substantially wider molecular weight distribution and higher Mw/Mn values (i.e. above about 3) than the prior art ethylene alpha olefin plastomers. As such, the previously known VLDPE copolymers have had higher impact strength, tensile strength, abrasion resistance and better processing characteristics. For example, by themselves these VLDPEs may be melt extruded into a primary tube and oriented into a heat shrinkable tube. The molecular weight/size distribution absolute values and Mw/Mn ratios for representative commercially available ethylene alpha-olefin copolymers are set forth in the following Table D. Unless indicated otherwise, these values were measured by the GPC procedure of ASTM D-3593-80.

TABLE D

| Molecular Weight/Size Distribution | |
| --- | --- |
| Type Compound and Manufacturer | Mw/Mn** |
| Union Carbide 1085 VLDPE (0.885 density, 0.8 MI) | 3.6 (118,000/33,000) |
| Union Carbide 1137 VLDPE (0.900 density, 1.0 MI) | 4.9 (125,000/25,700) |
| Union Carbide 1192 VLDPE (0.912 density, 0.19 MI) | 12.2 (196,900/16,080) |
| Union Carbide 1096-2 VLDPE (0.912 density, 0.38 MI) | 7.2 (137,000/19,110) |
| Dow 4001 VLDPE (0.912 density, 1.0 MI) | 5.1 (110,600/21,680) |
| Mitsui 0.896 density VLDPE | 4.0* |
| Mitsui 0.907 density VLDPE | 3.2* |
| Mitsui Tafmer A-4090 Plastomer | 2.0* |
| Mitsui Tafmer A-4085 Plastomer | 2.35 (108,000/46,000) |
| Mitsui Tafmer A-1085 Plastomer | 2.00 (160,000/80,000) |
| Matsui Tafmer A-0585 Ethylene Alpha Olefin | 2.05 (190,000/92,600) |
| Exxon EXACT 3033 Ethylene Alpha Olefin | 1.84 (92,000/50,000) |

*Reported by manufacturer in the aforementioned "Proceedings of Future-Pak '91", page 314. Procedure for measuring Mw/Mn not identified.
**Mw and Mn values are in g/mole.

Melt Index

Melt Index (MI) is a measure of the rate of extrusion of molten resins through a die, and reflects the molecular weight as well as the melt strength of the material. That is, relatively low MI values indicate higher molecular weight-higher melt strength resins. For purposes of this invention, suitable ethylene alpha olefin copolymers for use in forming the invention films have melt index values not exceeding about 1.5 as determined by ASTM D-1238, condition E (2.16 kg weight) at 190° C. As will be apparent from the following Table E (Melt Indices), this means that from the melt index standpoint these suitable ethylene alpha olefins (Exxon EXACT 3033 and Mitsui Tafmer A-0585) are more similar to previously known VLDPE materials than prior art plastomers.

TABLE E

Melt Indices

| Type Compound and Manufacturer | MI (g/10 min per ASTM D-1238 Condition E) |
|---|---|
| Union Carbide 1085 VLDPE | 0.8 |
| Union Carbide 1137 VLDPE | 1.0 |
| Union Carbide 1192 VLDPE | 0.19 |
| Union Carbide 1096-2 VLDPE | 0.38 |
| Dow 4001 VLDPE | 1.0 |
| Dow XU61520.01 VLDPE | 1.0 |
| Mitsui Tafmer A-4085 Plastomer | 3.6 |
| Mitsui Tafmer A-4090 Plastomer | 3.6 |
| Mitsui Tafmer A-1085 Plastomer | 1.4 |
| Exxon Exact 3027 | 3.5 |
| Exxon Exact 3033 | 1.2 |
| Mitsui Tafmer A-0585 | 0.5 |

Melting Points

There is a substantial difference in melting points between previously known VLDPE and prior art ethylene alpha olefin plastomers. In general, the latter have melting points below about 90° C. whereas prior art VLDPE materials have melting points above about 90° C. The aforementioned EVA (10% vinyl acetate content) has a melting point of 97° C. One ethylene alpha olefin copolymer suitable for use in this invention (Tafmer A -0585) has a relatively low melting point of about 67° C. Another suitable ethylene alpha olefin copolymer (Exact 3033) has a higher melting point of about 94° C. The melting points of various ethylene alpha olefins and EVA are summarized in Table F.

TABLE F

Melting Points (°C.)

| Type Compound and Manufacturer | MP (°C.) |
|---|---|
| Union Carbide 6833 EVA | 97 |
| Union Carbide 1137 VLDPE | 117 |
| Union Carbide 1085 VLDPE | 117 |
| Union Carbide 1063 VLDPE | 124 |
| Union Carbide 1064 VLDPE | 125 |
| Union Carbide 1092 VLDPE | 121 |
| Dow Attane 4001 VLDPE | 121 |
| Dow Attane 4003 VLDPE | 107/124 (two peaks) |
| Mitsui Tafmer A-4085 Plastomer | 71 |
| Mitsui Tafmer A-4090 Plastomer | 85 |
| Mitsui Tafmer A-1085 Plastomer | 71 |
| Mitsui Tafmer A-0585 Ethylene Alpha Olefin | 67 |
| Exxon Exact 3033 Ethylene Alpha Olefin | 94 |

Ethylene alpha olefins suitable for use as the primary thermoplastic polymer in the film of this invention have a melting point below about 102° C. Higher melting polymers do not provide the ultra high shrink characteristic of the inventive film.

Vicat Softening Point with the exception of Union Carbide's type 1085 material, previously known VLDPE materials tend to be less flexible and harder to penetrate than prior art plastomer-type ethylene alpha olefins, which tend to be more flexible and softer. In this regard at least one ethylene alpha olefin useful in the practice of this invention (Mitsui's Tafmer A-0585) is more similar to most prior art ethylene alpha olefin plastomers than previously known VLDPE materials. However, another preferred ethylene alpha olefin (Exxon's Exact 3033) is more similar to the latter than the former. This is illustrated by comparing Vicat softening points for the various materials as measured in accordance with ASTM 1525. By this procedure, Vicat softening point is the temperature at which a flat-ended needle of 1-mm$^2$ circular cross section will penetrate a thermoplastic specimen to a depth of 1 mm under a specified load using a selected uniform rate of temperature rise. Vicat softening points for various ethylene alpha olefins have been reported by the resin manufacturers and are summarized in Table G as follows.

TABLE G

Vicat Softening Point

| Type Compound and Manufacturer | VSP (°C.) per ASTM-1525 |
|---|---|
| Union Carbide 1085 VLDPE | 45 |
| Union Carbide 1137 VLDPE | 80 |
| Union Carbide 1063 VLDPE | 93 |
| Union Carbide 1064 VLDPE | 90 |
| Union Carbide 1569 VLDPE | 94 |
| Dow Attane 4001 VLDPE | 95 |
| Dow Attane 4003 VLDPE | 80 |
| Dow Attane 4004 VLDPE | 92 |
| Mitsui Tafmer A-1085 Plastomer | 58 |
| Mitsui Tafmer A-4085 Plastomer | 54 |
| Mitsui Tafmer A-4090 Plastomer | 65 |
| Mitsui Tafmer A-20090 Plastomer | 60 |
| Mitsui Tafmer A-0585 Ethylene Alpha Olefin | 62 |
| Exxon Exact 3033 Ethylene Alpha Olefin | 75–83 |

Tensile Properties

One of the characteristics of ethylene alpha olefins useful in the practice of this invention is the ability to absorb tensile stresses without rupturing. In particular the density should be between about 0.88 and about 0.905 g/cm$^2$, so that stresses are absorbed in the more numerous short chain branches present in the relatively high alpha olefin comonomer content of the copolymer. On the other hand, lower density resins are too rubbery for processing into a biaxially stretched film.

Another important property for characterizing suitable ethylene alpha olefin copolymers is its Young's Modulus, sometimes referred to as the modulus of elasticity, and associated with a polymer undergoing tensile deformation. It is the ratio of stress to strain below the proportional limit of a material. Stated otherwise, it is the stiffness or a measure of the resistance to tensile deformation that a polymer exhibits when a tensile stress is applied. Stiff materials have high values whereas low to moderate values indicate more elasticity and flexibility. For purposes of this invention, suitable ethylene alpha olefins have a Young's Modulus below about 850 kg/cm$^2$. These materials, like the prior art ethylene alpha olefin plastomers, can absorb more of the energy imparted by a projectile, leading to higher values of dynamic puncture. Also, their elasticity allows them to be biaxially stretched to a higher extent, leading to higher shrink in films. Mitsui, a manufacturer of ethylene alpha olefin plastomers, Tafmer A-0585 and previously known VLDPE materials, reports the following values for Young's Modulus as summarized in Table H. The latter also includes Young's Modules for Exxon's Exact 3033.

TABLE H

| Material | Young's Modulus Kg/cm² |
| --- | --- |
| Tafmer A-0585 | 400 |
| Tafmer A-4085* | 400 |
| Tafmer A-20090* | 600 |
| VLDPE (0.896 density)** | 800 |
| VLDPE (0.907 density)** | 1820 |
| Exact 3033*** | 773 |

*"Tafmer" publication of Mitsui Petrochemical Ind., Ltd., page 12
**"Proceedings of Future-Pak '91", page 314
***Supplied by Exxon From Table H, one would expect Tafmer A-0585 (like the prior art Tafmer-type ethylene alpha olefin plastomers), to be too weak to form monolayer biaxially stretched heat shrinkable films therefrom. It was in fact quite surprising that this could be done with Tafmer A-0585 to produce such film with commercially acceptable tensile strength properties and very high puncture resistance. It appears that Exact 3033 has a substantially higher Youngs Modulus value that Tafmer A-0585.

Shrinkage

The biaxially stretched film of the present invention are "heat-shrinkable", and as used herein this means the film has an unrestrained shrinkage of at least 50 percent in at least one of the machine and transverse directions at 90° C. Shrinkage values are obtained by measuring unrestrained shrink of the stretch film at 90° C. for five seconds. Four test specimens are cut from a given sample of the stretched film to be tested. The specimens are cut to 10 cm in the machine direction by 10 cm in the transverse direction. Each specimen is completely immersed for 5 seconds in a 90° C. water bath. The distance between the ends of the shrunken specimen is measured. The difference in the measured distance for the shrunken specimen and the original 10 cm is multiplied by ten to obtain the percent of shrinkage for the specimen. The shrinkage for the four specimens is averaged for the MD shrinkage values of the given film sample, and the shrinkage for the four specimens averaged for the TD shrinkage value.

The films of this invention are generally prepared from dry resins which are melted in an extruder and passed through a die to form the primary film material, most commonly in a tube form.

The well-known two step "double bubble" or trapped bubble process may be used to prepare the film of this invention (either monolayer or multilayer). One embodiment of this process is described in Pahlke U.S. Pat. No. 3,456,044. In this pahlke-type double bubble process a primary tube is prepared, cooled, reheated and the tube is simultaneously stretched in the machine direction ("MD") by operating longitudinally spaced nip rolls at different speeds, and in the transverse direction ("TD") by inflating air inside the tube. Suitable stretch ratios are from about 2 to about 6 with ratios of about 3 to about 5 preferred. The multilayer heat-shrinkable, puncture resistant biaxially stretched thermoplastic films of this invention may be formed into a primary tube by known techniques such as by coextruding at least the core layer and the first and second outer layers on each side of the core layer to form a primary tube as for example described in Canadian Patent No. 982923. Alternatively, the composite primary tube may be formed by coating lamination, wherein a first outer tubular layer is extruded and thereafter the core and second outer tubular layers are sequentially coated onto the outer surfaces of the first tubular layer and the core layer. As another alternative, the first outer and core outer layers may themselves be coextruded, and the second outer layer thereafter coated onto the outside surface of the core layer. Coating lamination procedures are described in Brax et al U.S. Pat. No. 3,741,253. As still another alternative, the at least three layer film may be formed as a sheet by the well-known slot casting procedure.

The preferred method for forming the films of this invention (both monolayer and multilayer) is coextrusion of a primary tube which is then biaxially oriented in the manner described in the aforementioned Pahlke Patent. In the following multilayer film Examples 2–5, all three layers were coextruded and the primary tube was cooled. It was then reheated to the draw temperature for biaxial orientation.

Although not essential in the practice of this invention, it may be desirable to cross-link a monolayer film embodiment or one or more layers of a multilayer embodiment of the inventive film for improvement of abuse and/or puncture resistance and other physical characteristics. This for example may be accomplished by irradiation using high energy electrons, ultra violet radiation, x-rays, beta particles and the like. The irradiation source can be any electron beam generator operating in a range of about 150 kilovolts to about 6 megavolts with a power output capable of supplying the desired dosage. The voltage can be adjusted to appropriate levels which may be for example 1 to 6 million volts or higher or lower. Many apparatus for irradiating films are known to those skilled in the art. The irradiation is usually carried out at a dosage up to about 20 MR, typically between about 1 MR and about 20 MR, with a preferred dosage range of about 2 MR to about 12 MR. Irradiation can be carried conveniently at room temperature, although higher and lower temperatures, for example, 0° C. to 60° C. may be employed.

Processwise, irradiation can be applied to a single substrate layer such as the first outer layer and prior to biaxial stretching if the primary multilayer film is prepared by coating lamination. This type of irradiative cross-linking is for example described in the aforementioned Brax et al U.S. Pat. No. 3,741,253. Alternatively, if the entire film is simultaneously coextruded it may be preferable to irradiate the entire multilayer film, and for maximum efficiency this should be done after biaxial stretching at a dosage level below about 8 MR, as for example described in Lustig et al U.S. Pat. No. 4,737,391.

Cross-linking may also be accomplished chemically through utilization of peroxides, as is well known to those skilled in the art. A general discussion of cross-linking can be found at pages 331 to 414 of volume 4 of the Encyclopedia of Polymer Science and Technology, Plastics, Resins, Rubbers, Fibers published by John Wiley & Sons, Inc. and copyrighted in 1966. This document has a Library of Congress Catalog Card Number of 64-22188.

Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well known additives such as processing aids, slip agents, antiblocking agents and pigments, and mixtures thereof may be incorporated into the film, by blending prior to extrusion. The resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing Temperatures may vary depending upon other process parameters chosen.

In extrusion of monolayer films according to this invention, extruder barrel and die temperatures may be as high as the melting point of the ethylene alpha olefin being processed. However depending upon such factors as other resins which may be employed, the manufacturing process used and particular equipment and other process parameters utilized, variations are expected. Actual process parameters including process temperatures will be set by one skilled in the art without undue experimentation. For example, in the 100% Exact 3033 sample 3A the extruder barrel temperature range was about 350°–400° F. and the die temperature was about 345°–355° F. whereas in the 100% Tafmer A-0585 sample 3 the extruder barrel temperature range was about 400°–450° F. and the die temperature was about 400° F.

Advantageously, a preferred embodiment of the inventive heat-shrinkable film will have a maximum extractable portion of 5.5 percent by weight of polymer in n-hexane at 50° C. for 2 hours as further described below. This 5.5 weight percent represents the desired maximum n-hexane extractable limit for olefin copolymers of the type employed by the present invention for use in articles that contact food except for articles used for packing or holding food during cooking. Beneficially, the maximum extractable portion as described above will be 2.6 percent in an especially preferred embodiment of the inventive film suitable or use in articles used in packing or holding food during cooking. The above maximum extractable values correspond to current limits for a class of resins intended for use in contact with food as set forth and described by the U.S. Food & Drug Administration in 21 CFR 177.1520 (which description is hereby incorporated in its entirety by reference). Mitsui, the manufacturer of Tafmer products, advises that these products meet these extractable limits (in the film surface contacting food) if Tafmer comprises no more than 40% of a blend with EVA or certain polyethylenes.

In all of the following examples, all films were prepared by the double or trapped bubble method as broadly described in the aforementioned Pahlke U.S. Pat. No. 3,456,044. In the multilayer embodiments of Examples 2–5, all three layers were simultaneously coextruded, cooled and then reheated for biaxial orientation. The VLDPE used was the aforedescribed Attane XU 61520.01 or 4001, both manufactured by the Dow Chemical Company of Midland, Mich., and comprising an ethylene and 1-octene copolymer with a density of about 0.912 gm/cc. The EVA was Union Carbide Corporation's type 6833 with 10 wt. % vinyl acetate content.

The extrusion-biaxial stretching equipment used in Examples 1–3 was laboratory (small) scale whereas the extrusion equipment used in Examples 4 and 5 was commercial size (large scale).

EXAMPLE 1

In Example 1, seven different pure component resins were used in attempts to manufacture heat shrinkable biaxially stretched monolayer films in tube form, and four of the runs were successful. Five of these resins were included for comparison with film of this invention, ie. sample 1 (Tafmer A-4085), sample 2 (Tafmer A-1085), sample 4, (Exxon's Exact 3027), sample 5 (EVA) and sample 6 (Dow's type 61520.01 VLDPE). Sample 3A (Tafmer A-0585) and sample 3B (Exact 3033) are ethylene alpha olefins suitable for manufacturing film of this invention. Tafmer types A-4085 and A-1085 have already been described as prior art ethylene alpha olefin plastomers.

Exact 3027 is an ethylene-butene copolymer manufactured by Exxon Chemical Company using a homogeneous metallocene single-site catalyst system. It is reported by the manufacturer as having a melt index of 3.5 (2 kg at 190° C.), density of 0.900 gms/cc, a single melting point of about 92° C., and an Mw/Mn of about 2. Exxon classifies its Exact materials with densities of at least about 0.900 gm/cc as VLDPE.

The films were all prepared in the same extrusion-orientation system of the general type disclosed in the aforementioned Pahlke Patent. The primary tube was about 2½ inches flat width inside diameter, and final heating to the draw temperature was by an air cushion which had itself been heated by transverse flow through a heated porous tube concentrically positioned around the moving primary tube. The final tube was about 12 inches inside diameter and the film thicknesses were about 2 mils.

Physical properties of the resulting monolayer films were measured and are summarized in Table I.

TABLE I

| | | Monolayer Nonirradiated Films | | | | | | |
|---|---|---|---|---|---|---|---|---|
| | | Sample No. | | | | | | |
| | Units | 1 | 2 | 3A | 3B | 4 | 5 | 6 |
| Formulation | | 100% Tafmer A-4085 | 100% Tafmer A-1085 | 100% Tafmer A-0585 | 100% Exact 3033 | 100% Exact 3027 | 100% EVA (UCC-6833) | 100% VLDPE (Dow 61520.01) |
| Tensile Strength, MD/TD | psi | Could Not Form | Could Not Form | 7318/8691 | 5976/6556 | Could Not Form | 7474/11330 | 13258/15463 |
| Elongation at break, MD/TD | % | Film From Resin | Film From Resin | 202/180 | 245/64 | Film From Resin | 190/210 | 235/227 |
| Shrink | % | | | 68/63 | 30/40[(2)] | | 30/48 | 18/31 |

TABLE I-continued

| | | Monolayer Nonirradiated Films | | | | | | |
| | | Sample No. | | | | | | |
| | Units | 1 | 2 | 3A | 3B | 4 | 5 | 6 |
|---|---|---|---|---|---|---|---|---|
| @90° C., MD/TD Dynamic Puncture | cmkg/mil | | | 11.5 | 38.2 | | 2.47 | 2.90 |
| Hot Water Puncture (metal/wood probe @ 95° C.) | sec. | | | (1) | 10.8/74+ | | 33.6/120+ | 120+/120+ |
| Haze | % | | | 4.3 | 1.5 | | 1.7 | 2.8 |
| Gloss | H.U. | | | 77.4 | 86.6 | | 89.2 | 87.8 |

(1)Melts at 67° C.
(2)This value is inconsistant with other shrink measurements for Exact 3033 (eg. samples 8b and 16A) and should be disregarded.

Referring now to Table I, sample 1 (100% Tafmer A-4085), sample 2 (100% Tafmer A-1085) and sample 4 (100% Exact 3027) could not be formed into film tubes, yet sample 3A (100% Tafmer A-0585) formed a heat shrinkable biaxially stretched film with outstanding physical properties. This will be apparent from a comparison with the physical properties of sample 5 (100% EVA - 10% vinyl acetate) and sample 6 (100% VLDPE - 0.912 density) heat shrinkable biaxially stretched films.

More specifically, even though the physical properties of Tafmer A-4085, Tafmer A-1085 and Tafmer A-0585 resins are very similar, it was unexpectedly discovered that a monolayer heat shrinkable biaxially stretched film with uniquely advantageous physical properties (relative to other ethylene alpha olefin copolymers) only could be prepared from Tafmer A-0585. For example, its tensile strength and elongation characteristics are at commercially acceptable levels, yet its shrink properties far surpass those of 100% EVA. This was very surprising because EVA has been generally recognized as providing the highest biaxial shrink properties of widely used ethylene copolymers. Moreover the dynamic puncture resistance of 100% Tafmer A-0585 sample 3A was unexpectedly several times higher than 100% VLDPE sample 6. This was unexpected from a comparison of their resin physical properties, and particularly since prior art polyethylene films of this general type have been recognized by those skilled in the art as providing the highest strength properties of ethylene alpha olefin-based heat shrinkable biaxially stretched films. Sample 3A demonstrates a preferred monolayer embodiment having puncture strength of at least about 10 cmkg/mil. It should be noted, however, that because of its relatively low melting point (67° C.), 100% Tafmer A-0585 film is not suitable for systems wherein the film is heat shrunk by contact with boiling water. Also, its optical properties are somewhat inferior to the prior art film samples 5 and 6.

It is believed that the reasons why heat shrinkable biaxially oriented monolayer film can be prepared from Tafmer A-0585 but not from Tafmer A-4085 or Tafmer A-1085 or Exact 3027 are the aforedescribed differences in melt index and possibly Mw and Mn. Compared to prior art VLDPE, the remarkably higher shrink and dynamic puncture values are believed due to differences in density, melting point, Mw/Mn, and possibly Mw and Mn. Finally compared to EVA sample film 5, the much high shrink performance of invention film sample 3 is believed in part due to its greater elasticity.

Sample 3B (100% Exact 3033) is another ethylene which has unexpectedly superior properties compared to prior art elastomeric ethylene alpha olefins such as Tafmer A-4085 Sample 1. That is, it formed a heat shrinkable biaxially stretched film with certain outstanding physical properties. For example, although its tensile strength and elongation characteristics were somewhat inferior to the other monolayer samples 3A, 5 and 6, its shrink properties were comparable to 100% EVA (sample 5) and substantially better than 100% prior art VLDPE (sample 6). Moreover, its dynamic puncture resistance of 38 cmkg/mil was far superior to the other films and over three times higher than the 100% Tafmer A-0585 film sample 3A embodiment of the invention. The latter in turn has about four times the puncture resistance of the best performing prior art film (VLDPE sample 6). The optical properties of Exact 3033 film sample 3B are comparable with the best prior art film in this regard (EVA sample 5).

Table I demonstrates that monolayer films of this invention are unexpectedly superior to prior art films used in shrink packaging food products wherein an oxygen barrier is not required, eg. poultry such as chicken. Accordingly, with acceptably low n-hexane extractables these films would also be suitable for such end uses.

EXAMPLE 2

In Example 2, five nonirradiated multilayer films (samples 7–10) were prepared each with a vinylidene chloride copolymer-type core layer sandwiched between two identical outer layers. All films were the heat shrinkable biaxially stretched type of about 2.0 mils overall thickness. One outside layer (the inner layer of the tube which would become the inner and heat-sealing layer of bags formed from the tube) was about 1.2 mils thick. The other outside layer (the outer layer of the tube which would become the outer abuse-resistant layer of bags formed from the tube) was about 0.6 mils thick. The purpose of Example 2 was to compare physical and optical properties of three layer films of the oxygen barrier core layer type prepared in a small scale extrusion-biaxial stretching system. In these films the outer layers are formed of blends including ethylene alpha olefin compositions according to this invention (samples 8–10), and a prior art commercially employed VLDPE-EVA blend (sample 7) was used as the control. Unless otherwise stated, the formulation amounts making up the blends used in this Example 2 and in the following examples are all on a weight basis.

The films were all prepared in the same small scale-orientation system of the general type described in the Pahlke Patent. The extruder barrel and die temperatures were about 320°–330° C. The primary tube was about 4 1/8 inch inside diameter and the final biaxially stretched tube was about 19 inches inside diameter.

Physical and optical properties of the resulting nonirradiated three layer films were measured and are summarized in Table J.

TABLE J

Three Layer Films[2] — Nonirradiated and Small Scale

| | Units | Sample No. 7 | Sample No. 8A | Sample No. 8B | Sample No. 9 | Sample No. 10 |
|---|---|---|---|---|---|---|
| Formulation[1] of Outer Layers | weight | 70.6% Dow 4001, VLDPE 25.0% EVA | 69.1% Tafmer A-0585, 22.5% EVA | 70% Exact 3033 25% EVA | 40% Tafmer A-0585, 33% Exact 3033, 23% EVA | 55% Exact 3033, 40% Tafmer A-0585 |
| Tensile Strength, MD/TD | psi | 12430/12228 | 15592/12075 | 16465/12006 | 11640/12102 | 15505/10223 |
| Elongation at break, MD/TD | % | 173/184 | 180/256 | 133/147 | 206/208 | 178/220 |
| Shrink @90° C., MD/TD | % | 23/33 | 56/52 | 45/46 | 44/46 | 53/48 |
| Shrink Force @ 90° C. MD/TD | g/mil | 131/178 | 80/60 | 147/128 | 123/109 | 146/80 |
| Dynamic Puncture | cmkg/mil | 2.5 | 8.0 | 6.1 | 4.7 | 7.9 |
| Hot Water Puncture (wood/metal probe @ 95° C.) | sec. | 19.8/— | 4.8/1.5 | 12.6/1.4 | 6.9/2.4 | 115+/2.2 |
| Haze | % | 8.6 | 5.7 | 2.4 | 2.2 | 2.4 |
| Gloss | H.U. | 70.8 | 72.1 | 90.2 | 92.4 | 90.9 |

[1]Difference between 100% and reported total is processing aid(s).
[2]Oxygen barrier-core layer is a blend of 85% vinylidene chloride-methyl acrylate and 15% vinylidene chloride-vinyl chloride copolymers.

Summarizing Table J, samples 8A, 8B, 9 and 10 are embodiments of the invention and may be compared with sample 7, a heat shrinkable biaxially stretched film used after irradiation and in bag form for packaging fresh red meat and processed meats. Since they contain about 70% type 4001 VLDPE, sample 8A (69.1% Tafmer A-0585) and sample 8B (70% Exact 3033) may be directly compared with control sample 7 because in each instance the balance of the composition is primarily EVA plus a small percentage of processing aids. Both invention samples 8A and 8B have substantially higher MD tensile strength and shrink in both directions than prior art sample 7. Moreover, the dynamic puncture resistances of samples 8A and 8B are severalfold higher than prior art VLDPE sample 7. This was surprising because, as previously stated, prior art VLDPE is known to provide the highest puncture resistance to the ethylene alpha olefin copolymer type inner and outer layers of state-of-art multilayer oxygen barrier type films. The optical properties of the 70% Exact 3033 sample 8B were far superior to the 70% VLDPE control sample 7, whereas the hot water puncture value of sample 8A was relatively low because of the low Tafmer A-0585 melting point. However, far superior results were obtained by blending Exact 3033 and Tafmer A-0585 (discussed below). The optical properties of the 70% Exact 3033 sample 8B were far superior to the 70% VLDPE control sample 7, whereas the 69% Tafmer A-0585 film sample 8A optical properties were slightly better than prior art sample 7. These improvements are believed to be related to differences in density, Mw/Mn, possibly Mw and Mn, melting point and Young's Modulus.

Samples 9 (40% Tafmer A-0585, 33% Exact 0633, and 23% EVA) and 10 (55% Exact 0633 and 40% Tafmer A-0585) demonstrate that physical properties may be adjusted by blending the ethylene alpha olefin copolymer of this invention either in a two component blend or in a three component blend with at least one other constituent such as EVA.

More particularly, sample 9 provides higher shrink force, hot water puncture and superior opticals relative to 69% Tafmer A-0585 sample 8A, by replacing some of the Tafmer A-0585 with Exact 3033. However, the tensile strength, shrink and dynamic puncture values are made somewhat lower by the substitution. Sample 10 demonstrates that a two component blend provides the best balance of all Table I invention embodiments. Accordingly, one preferred embodiment of this invention involves use of a blend comprising the aforedescribed Tafmer A-0585 ethylene alpha olefin copolymer, and another ethylene alpha olefin copolymer prepared by a metallocene single site catalyst-Exact 3033.

Table J shows that with respect to nonirradiated multilayer films prepared in small scale equipment, the three layer-oxygen barrier core type with the present ethylene alpha olefin copolymers in the inner and outer layers are superior in terms of certain physical properties to comparable prior art films currently used for shrink packaging fresh red meat and processed meat. Since the other physical properties of these inventive films are commercially acceptable, they are also suitable for these end uses. This of course presumes that if the film is intended for direct contact with food it will satisfy the n-hexane extractable limit. As will be discussed below in more detail in connection with Example 3, the physical properties of the nonirradiated Tafmer A-0585 and Exact 0633 blend sample 10 is actually superior to its irradiated counterpart. Accordingly, in some end uses where the evacuated packages are sealed by clipping or where the sample 10 inner layer heat seal temperature range is adequate, irradiation may be avoided.

EXAMPLE 3

In Example 3, five irradiated multilayer films (samples 11–14) were prepared each with a vinylidene chloride copolymer-type oxygen barrier core layer sandwiched between two identical outer layers. All films were the heat shrinkable biaxially stretched type of about 2.0 mils overall thickness. The heat sealing outer layer was about 1.2 mils thick and the abuse-resistant outer layer was about 0.6 mils thick.

The purpose of Example 3 was to compare physical and optical properties of irradiated three layer films of the oxygen barrier core layer type. In these films the outer layers are formed of blends including ethylene alpha olefin compositions according to this invention (samples 12–14) and a prior art commercially employed VLDPE-EVA blend (sample 11) used as the control.

The same small scale extrusion-orientation system was used to prepare each of samples 11–14, and it was the same system used in Example 2. The biaxially stretched films were irradiated to about 4 MR (after orientation) in the manner described in Lustig et al U.S. Pat. No. 4,737,391.

Physical and optical properties of the resulting irradiated three layer films were measured and are summarized in Table K.

outer layer on each side of the barrier-core layer. The outer layers each comprise a blend of between about 65% and 75% of the selected ethylene alpha olefin, and between about 20 and 30% ethylene vinyl acetate. The film preferably has dynamic puncture strength of at least about 3 cmkg/mil.

Improvements over the control sample 11 are also achieved by substituting a different ethylene alpha olefin copolymer (Exact 3033) for a portion of the Tafmer A-0585 ethylene alpha olefin of this invention to form a three component blend (sample 12), or using a two component blend of Exact 3033 and Tafmer A-0585 in the inner and outer layers (sample 13). However, comparison of physical properties with nonirradiated sample 10 (Table J) having the same composition suggests that since the irradiated film properties are inferior, irradiation should only be employed if needed to broaden the heat sealing range of the inner layers and improve the hot water puncture resistance.

Since the control prior art film is commercially used to shrink package fresh red meat and processed meat and the invention film samples have certain improved physical properties compared to this prior art film and the remaining physical properties are commercially acceptable, these film

TABLE K

Three Layer Films[2] — Irradiated[3] and Small Scale

| | Units | Sample No. 11 | 12 | 13 | 14 | 14A |
|---|---|---|---|---|---|---|
| Formulation[1] of Outer Layers | weight | 70.6% Dow 4001 VLDPE 25.0% EVA | 40% Tafmer A-0585, 33% Exact 3033, 23% EVA | 55% Exact 3033, 40% Tafmer A-0585 | 69.1% Tafmer A-0585, 22.5% EVA | 70% Exact 3033, 25% EVA |
| Tensile Strength, MD/TD | psi | 13070/13035 | 14233/12085 | 15210/12725 | 15223/12182 | 19125/16545 |
| Elongation at break, MD/TD | % | 185/202 | 174/212 | 159/202 | 161/301 | 144/155 |
| Shrink @90° C., MD/TD | % | 22/32 | 40/42 | 49/44 | 61/46 | 44/45 |
| Shrink Force @ 90° C. MD/TD | g/mil | 111/173 | 131/109 | 149/96 | 85/31 | 173/136 |
| Dynamic Puncture | cmkg/mil | 2.62 | 3.48 | 4.23 | 5.48 | 3.95 |
| Hot Water Puncture (wood/metal probe @ 95° C.) | sec. | 120+/20.4 | 120+/101 | 120+/120+ | — | 120+/120+ |
| Haze | % | 7.9 | 3.0 | 3.4 | 3.5 | 2.1 |
| Gloss | H.U. | 73.2 | 85.0 | 83.6 | 82.1 | 91.2 |

[1]Difference between 100% and reported total is processing aid(s).
[2]Oxygen barrier-core layer is a blend of 85% vinylidene chloride-methyl acrylate and 15% vinylidene chloride-vinyl chloride copolymers.
[3]Irradiation dose is 4MR.

Summarizing Table K, samples 13–14 are embodiments of the invention and may be compared with sample 11, an irradiated heat shrinkable biaxially stretched film used in bag form for packaging fresh red meat and processed meats. Since control sample 11 contains about 70% type 4001 VLDPE, sample 14A (Tafmer A-0585) and sample 14B (Exact 3033) may be directly compared because in each instance the remainder is primarily EVA and a small amount of processing aids. Samples 14A and 14B have substantially higher tensile strength (14A only in MD) and shrink in both directions. Moreover, the dynamic puncture resistance of both samples 14A and 14B are substantially higher than control sample 11. Finally, the optical properties of both samples 14A and 14B are superior to control sample 11.

Samples 14A and 14B illustrate a preferred embodiment of this invention comprising an irradiated biaxially stretched film with three layers. It includes a vinylidene chloride-methyl acrylate copolymer oxygen barrier-core layer and an embodiments of the invention are suitable for the same end use.

EXAMPLE 4

In Example 4, five nonirradiated biaxially stretched and heat shrinkable multilayer films (samples 15–18) were prepared, each with a vinylidene chloride copolymer-type oxygen barrier core layer sandwiched between two identical outer layers. All films were the heat shrinkable biaxially stretched type of about 2 mils overall thickness. The heat sealing outer layer was about 1.2 mils thick and the abuse-resistant outer layer was about 0.6 mils thick. Samples 15 (Dow type XU 61520.01 VLDPE-EVA blend outer layers) 17 (100% Dow type 4001 VLDPE outer layers) and 18 (100% EVA outer layers) are film compositions commercially used in the irradiated form for meat packaging. Samples 16A (91.6% Exact 3033) and sample 16B (Exact 3033-Tafmer A-0585 blend) are embodiments of this invention.

A large scale extrusion-biaxial stretching system of the Pahlke Patent type was used to prepare samples 15–18. The primary tube was about 2 inches inside diameter flat width whereas the final biaxially stretched tube flat width was about 10 inches inside. Final heating to the draw temperature was by an air cushion which had itself been heated by transverse flow through a heated porous tube concentrically positioned around the moving primary tube.

The purpose of Example 4 was to compare physical and optical properties of nonirradiated three layer films of the oxygen barrier core layer type, prepared in a large scale commercial type extrusion-biaxial stretching system.

Physical and optical properties of the resulting nonirradiated three layer film were measured and are summarized in Table L.

inner and outer layers. In particular, sample 16B has the highest shrink in both directions as well as the highest dynamic puncture value of all film samples in this test series. Its optical properties were nearly as good as the best prior art film from this standpoint (sample 17).

EXAMPLE 5

In Example 5, seven irradiated multilayer films (samples 19–23) were prepared with a vinylidene chloride copolymer-type oxygen barrier core layer sandwiched between two identical outer layers. The overall thickness of the films was about 2 mils, the heat sealable outer layer thickness was about 1.2 mils and the abuse-resistant outer layer was about 0.6 mils thick. Sample 19 (Dow XU 61520.01 type VLDPE-EVA blend outer layers) and sample 23A (100% EVA outer layers) are commercially used for meat packaging and are the control films. Samples 20A and 20B, 21, 22 and 23B

TABLE L

Three Layer Films[2] — Nonirradiated and Large Scale

| | | Sample No. | | | | |
|---|---|---|---|---|---|---|
| | Units | 15 | 16A | 16B | 17 | 18 |
| Formulation[1] of Outer Layers | weight | 69.1% VLDPE[3] 22.5% EVA | 91.6% Exact 3033 | 56.0% Exact 0633, 40.0% Tafmer A-0585 | 100% VLDPE[4] | 100% EVA |
| Film Thickness | mil | 2.07 | 2.35 | 2.62 | 2.5 | 2.10 |
| Tensile Strength, MD/TD | psi | 16068/14508 | 16075/17340 | 15130/14685 | 14498/15475 | 9384/11338 |
| Elongation at break, MD/TD | % | 215/200 | 236/171 | 267/208 | 198/174 | 135/158 |
| Shrink @90° C., MD/TD MD/TD | % | 28/39 | 53/59 | 57/60 | 24/36 | 40/50 |
| Shrink Force @90° C. MD/TD | g/mil | 150/195 | 153/203 | 143/152 | — | 143/145 |
| Dynamic Puncture | cmkg/mil | 2.13 | 4.76, 5.54 | 7.23, 8.36 | 3.27 | 1.71 |
| Hot Water Puncture (wood/metal probe @95° C.) | sec. | 120+/50.4 | 87.6/12.6 | 18.6/8.4 | 27.0 | 120+ |
| Haze | % | 6.4 | 4.4 | 3.9 | 2.8 | 4.5 |
| Gloss | H.U. | 74.7 | 88.2 | 84.6 | 90.9 | 82.0 |
| Tear Strength MD/TD | gm/mil | 27/33 | 64/41 | 61/51 | — | — |

[1] Difference between 100% and reported total is processing aid(s).
[2] Oxygen barrier-core layer is a blend of 85% vinylidene chloride methyl acrylate and 15% vinylidene chloride-vinyl chloride copolymers
[3] Dow type XU 61520.01 VLDPE
[4] Dow type 4001 VLDPE.

Referring now to Table L, sample 16A (91.6% Exact 3033) and sample 16B (56.0% Exact 0633-40.0% Tafmer A-0585) are invention embodiments whereas samples 15 (69% VLDPE and 22.5% EVA), 17 (100% VLDPE) and 18 (100% EVA) are prior art films. Since invention embodiment sample 16A has 91.6% Exact 3033 in the inner and outer layers it may be compared with the 100% EVA and 100% VLDPE prior art films. The sample 16A overall tensile strength is significantly higher than that of the highest prior art film. Moreover the sample 16A shrink in both directions is significantly higher than the highest heat shrinkable prior art film (EVA sample 18). The dynamic puncture resistance of 91.6% Exact sample 16A is substantially higher than that of the prior art films (VLDPE sample 17).

Sample 16B demonstrates that certain improvements in physical properties over comparable prior art film may be realized by using two component blends of the present ethylene alpha olefin copolymer of this invention and another ethylene alpha olefin copolymer of this invention prepared by a metallocene single site catalyst system, in the have outer layers containing either Tafmer A-0585, Exact 3033 or both and are embodiments of this invention. All films were post-irradiated to about 4 MR in the manner generally described in previously referenced Lustig et al Patent '391.

The same large scale extrusion-orientation system used in Example 4 was used in Example 5. That is, the primary tube inside diameter was about 2 inches and the biaxially stretched tube diameter was about 10 inches.

The purpose of Example 5 was to compare physical and optical properties of invention embodiments with prior art irradiated three layer films of the oxygen barrier core layer type commercially used for shrink packaging of meat, wherein the films were prepared in a large scale commercial type extrusion-biaxial stretching system.

Physical and optical properties of the resulting irradiated three layer were measured and are summarized in Table M.

TABLE M

Three Layer Films — Irradiated[1] and Large Scale

| | Units | 19 | 20A | 20B | 21 | 22 | 23A | 23B |
|---|---|---|---|---|---|---|---|---|
| Formulation of Outer Layers | weight | 69.1% VLDPE[2] 22.5% EVA | 70% Tafmer A-0585, 25% EVA | 69.1% Exact 3033, 22.5% EVA | 55% Exact 3033, 40% Tafmer A-0585 | 40% Tafmer A-0585, 33% Exact 3033, 23% EVA | 100% EVA 6833 | 91.6% Exact 3033 |
| Tensile Strength, MD/TD | psi | — | 10088/11380 | 17648/16565 | 9627/7688 | 9627/7688 | 10000/12000 | — |
| Elongation at break, MD/TD | % | — | 177/196 | 171/133 | 191/146 | 191/146 | 132/192 | — |
| Shrink @ 90° C., MD/TD | % | 26/35 | 58/59 | 46152 | 57/58 | 57/58 | 33/46 | 57/57 |
| Dynamic Puncture | cmkg/mil | 2.4 | 3.3 | 2.6 | 3.1 | 3/1 | 2.1 | 3.6 |
| Hot Water Puncture (metal probe @ 90° C.) | sec. | — | 3.6 | 16.8 | 4.2 | 4.2 | — | — |
| Haze | % | 6.9 | 9.6 | 3.7 | 9.3 | 9.3 | 6.8 | 9.7 |
| Gloss | H.U. | 81.8 | 68.9 | 84.7 | 64.6 | 64.6 | 76.6 | 70.8 |

[1]All films were irradiated at 4 MR.
[2]Dow XU 61520.01 type VLDPE.

Referring now no Table M, invention film samples 20A and 20B may be compared with control sample 19 because each has about 70% ethylene alpha olefin copolymer. In each instance the balance of the composition is primarily EVA with a small percentage of processing aids. With respect to tensile strength, sample 20B (69.1% Exact 3033) has a very high value. The tensile strength of invention sample 20A (70% Tafmer A-0585) is considerably lower than the Exact 3033 film sample 20B but about the same as the commercially used 100% EVA inner-outer layer film sample 23A. The dynamic puncture strength of Tafmer A-0585 invention sample 20A is substantially higher than prior art VLDPE sample 19 or Exact 3033 invention sample 20B. In terms of optical properties, the 69% Exact 3033 sample 20B of the invention was substantially superior to all of the prior art films whereas the 70% Tafmer A-0585 invention sample 20A was somewhat inferior.

With respect to shrink, invention film samples 20A and 20B are far superior to previously known both VLDPE sample film 19, and in fact superior to 100% EVA inner-outer layer film sample 23A. As previously explained, this was surprising because EVA is known in the art as providing the best shrink of commercially used ethylene copolymer inner and outer layer type oxygen barrier multilayer films. Sample 20A demonstrates a preferred embodiment of the invention wherein the film shrinks at least 55% in both the machine and transverse directions at 90° C.

Table M also demonstrates that invention film sample 23B (91.6% Exact 3033) is superior to 100% EVA sample 23A as well as the aforementioned prior art VLDPE sample 19 in certain respects. For example, its shrink (in both directions) and dynamic puncture is superior to both of the Table M prior art films. However, its optical properties are somewhat inferior.

Invention film sample 21 (55% Exact 3033 and 40% Tafmer A-0585) demonstrates that a blend of two ethylene alpha olefin copolymers of this invention including one prepared by a metallocene single site catalyst system (Exact 3033) in the inner and outer layers provides substantially higher shrink than the best performing comparable prior art film (100% EVA sample 23A).

Invention film embodiment sample 22 demonstrates that a three component blend of 40% Tafmer A-0585, 33% Exact 3033 and 23% EVA provides certain improved physical properties. For example, its shrink (in both directions) is substantially higher than the best performing prior art film (100% EVA sample 23). Also, its dynamic puncture strength is substantially higher than the best performing prior art film (69.1% previously known VLDPE sample 19). However, its optical properties are somewhat inferior.

Since the control films are commercially used to package fresh red meat and processed meat, and the Table M invention embodiments are superior in terms of certain physical properties and commercially acceptable with respect to the remaining physical properties, the latter are also suitable for the same end use if they satisfy n-hexene extractable limits.

In the Example 2–5 comparisons with films prepared from previously known VLDPE, the latter's density was about 0.912 g/cm$^3$ Lower density VLDPE materials are also commercially available and provide films with relatively higher shrink values than a higher density VLDPE prepared from the same alpha olefin comonomer, eg. C8. The basic reason for this difference is that lowering density increases film flexibility. However, their shrink and puncture strength properties are inferior to the previously described invention embodiments. Accordingly, previously known lower density VLDPE materials such as those of about 0.910 g/cm$^3$ and below (and having melt indices on the order of about 1.0 g/10 min and below), cannot be used to prepare films having properties equivalent to the films of this invention.

This was demonstrated in a series of three layer film tests wherein the barrier layer was identical to the Examples 2–5 films and the outer layers comprised about the same percentages of previously known VLDPE (approximately 70%) and EVA (25% Union Carbide type 6833) as in several samples of Examples 2–5. The control film of these tests included the same 0.912 density Dow type 4001, used for example in previously described samples 7 and 15. Two other previously known VLDPE materials were used: Dow's type XU 61512.21 having 0.901 g/cm$^3$ density and 1.0 g/10 min melt index, and Dow's type XU 61509.32 having 0.911 g/cm$^3$ density and 0.5 melt index. In each instance the comonomer was octene-1.

EXAMPLE 6

In Example 6, four nonirradiated heat shrinkable multilayer film samples 24–27 were prepared by the previously described coextrusion-type double bubble process in laboratory (small) scale equipment. In each instance the primary tube was about 3.25 inches flat width inside diameter, the final tube was about 13 inches inside diameter and the film thicknesses were about 2 mils. Physical and optical properties of these films were measured and the results are summarized in Table N. The latter shows that sample 27 (0.901 density previously known VLDPE) provides substantially higher heat shrink than samples 24 and 25 (0.912 density previously known VLDPE). As previously explained, this was because of the greater flexibility afforded by lower density material. However, lower density VLDPE sample 27 also has substantially lower dynamic puncture strength than the highest performing 0.912 density VLDPE sample 24. The shrink and dynamic puncture strength characteristics of 0.911 density VLDPE sample 26 are substantially the same as 0.912 density VLDPE sample 24.

TABLE N

Low Density VLDPE Three Layer Films
Nonirradiated and Small Scale

|  | Units | Sample No. 24 | Sample No. 25 | Sample No. 26 | Sample No. 27 |
| --- | --- | --- | --- | --- | --- |
| Formulation of Outer Layers | weight | 70.6% VLDPE[1] 25.0% EVA | 70.6% VLDPE[1] 25.0% EVA | 70.6% VLDPE[2] 25.0% EVA | 70.6% VLDPE[3] 25.0% EVA |
| Tensile Strength, MD/TD | psi | 12330/12815 | 13070/13035 | 13157/12980 | 11040/12435 |
| Elongation at break, MD/TD | % | 211/206 | 185/202 | 191/207 | 194/196 |
| Shrink @ 90° C., MD/TD | % | 20/36 | 22/32 | 20/36 | 36/41 |
| Dynamic Puncture | cmkg/mil | 3.24 | 2.62 | 3.07 | 2.59 |
| Haze | % | 6.5 | 7.9 | 4.8 | 6.5 |
| Gloss | H.U. | 70.7 | 73.2 | 79.8 | 76.9 |

[1]Dow 4001 type VLDPE (0.912 density)
[2]Dow XU 61509.32 type VLDPE (0.911 density, 0.5 MI)
[3]Dow XU 61512.21 type VLDPE (0.901 density, 1.0 MI)

The Table N results may be qualitatively compared with the Example 2 (Table J) results since both sets of film samples were prepared in small scale equipment, have the same type formulations with the same 0.912 density VLDPE-containing outer layer control sample, and are nonirradiated. More particularly, sample 8A (69.1% Tafmer A-0585, 22.5% EVA) has very high shrink (56/52%) and dynamic puncture strength (8.0 cmkg/mil) compared to 0.912 density VLDPE control sample 7. Low density VLDPE sample 27 also has substantially lower heat shrink (36/41%) than the present invention (at least 50% in at least one direction). Also, the dynamic puncture strength (2.59 cmkg/mil) is only about one third as high as the aforementioned invention sample 8A.

EXAMPLE 7

In Example 7, three nonirradiated heat shrinkable film samples 28–30 were prepared by the previously described coextrusion-type double bubble process in a large scale (commercial type) system. The primary tube was about 2 inches inside diameter flat width, the final biaxially stretched tube flat width was about 10 inches inside and about 2 mils thick. Physical and optical properties of these films were measured and the results are summarized in Table O. The latter shows that sample 29 (0.901 density previously known VLDPE) provides higher shrink than sample 28 (0.912 density previously known VLDPE) or sample 30 (0.911 density previously known VLDPE). As previously explained this was probably due to greater flexibility of the lower density material.

The Table O results may be qualitatively compared with the Example 4 (Table L) results since both sets of three layer film samples were prepared in very similar large scale equipment, have the same type formulation with the same 0.912 density VLDPE-containing outer layer control sample, and are nonirradiated. More particularly, invention film embodiments sample 16A (91.6% Exact 3033) sample 16B (40% Tafmer A-0585, 56% Exact 0633) have much higher puncture strengths than previously known 0.912 density VLDPE-containing sample 15. Accordingly, it is believed that a comparable embodiment of the inventive film would have substantially higher puncture strength than a 0.901 density previously known VLDPE-containing outer layer type film such as sample 30. From the shrink standpoint, invention samples 16A and 16B have very high values compared to sample 15, which is substantially the same composition as control sample 28 of this Example 7. Accordingly, a comparable embodiment of the inventive film would have substantially higher shrink values than the 32/39% values of sample 30.

Although preferred embodiments of this invention have been described in detail, it is contemplated that modifications thereof may be made and some preferred features may be employed without others, all within spirit and scope of the broad invention.

TABLE O

Low Density VLDPE Three Layer Films
Nonirradiated and Large Scale

|  | Units | Sample No. 28 | Sample No. 29 | Sample No. 30 |
|---|---|---|---|---|
| Formulation of Outer Layers | weight | 70.6% VLDPE[1]<br>25.0% EVA | 70.6% VLDPE[2]<br>25.0% EVA | 70.6% VLDPE[3]<br>25.0% EVA |
| Tensile Strength, MD/TD | psi | 13758/13633 | 12765/12298 | 14053/13595 |
| Elongation at break, MD/TD | % | 197/221 | 209/242 | 184/207 |
| Shrink @ 90° C., MD/TD | % | 34/39 | 42/44 | 32/39 |
| Dynamic Puncture | cmkg/mil | 2.79 | 2.94 | 3.18 |
| Haze | % | 5.7 | 5.2 | 6.4 |
| Gloss | H.U. | 79.4 | 79.5 | 76.5 |

[1] Dow 4001 type VLDPE
[2] Dow XU 61512.21 type VLDPE (0.901 density, 1.0 MI)
[3] Dow XU 61509.32 type VLDPE (0.911 density, 0.5 MI)

EXAMPLE 8

In this Example, three nonirradiated multilayer films (samples 31–33) and three irradiated multilayer films (samples 34–36) were prepared as were the films of Examples 2. The outer layers were formed of blends including ethylene alpha olefin compositions according to this invention (samples 32, 33, 35, 36). Prior art commercially employed VLDPE-EVA blends (samples 31, 34) were used as the controls.

Example 31 is a nonirradiated control film made with the XU 61520.01 VLDPE as previously described; Exxon LD 701, a 0.2 MI EVA with a vinyl acetate content of 10.5%; and Exxon 4011, a butene comonomer plastomer having a melt index of 2.2, a density of 0.885, a melting point of 66° C., and a Vicat softening point of 70° C.

Example 32 is nonirradiated film that is an embodiment of the invention combining Exxon LD 701; a Dow Affinity VLDPE (PL 1880); and Mitsui Tafmer 0585. PL 1880 is an octene comonomer with a density of 0.902, a melting point of 100° C. (reported by Dow), with a Vicat Softening Point of 83° C., and a melt index of 1.

Example 33 is a nonirradiated film that is an embodiment of the invention combining Exxon LD 701; Mitsui Tafmer 0585; and Exxon Exact 3033.

The dynamic puncture properties of samples 32 and 33 are substantially higher than that of the prior art film, sample 31.

The irradiated samples are the control film sample 34, and films of the present invention, samples 35 and 36. These films were irradiated at about 4 Mrad. The formulations of these samples are the same as samples 31, 32, and 33 respectively, and the higher dynamic puncture is seen with the inventive films.

Physical and optical properties of the resulting nonirradiated and irradiated films were measured and are summarized in Tables P and Q respectively.

TABLE P

Nonirradiated Three Layer Films — Small Scale.

|  | Units | SAMPLE 31 | SAMPLE 32 | SAMPLE 33 |
|---|---|---|---|---|
| FORMULATION OF OUTER LAYERS | Weight | 25.8% XU61520.01<br>39.7% LD701<br>34.5% 4011 | 36.8% PL1880<br>26.4% LD701<br>36.8% 0585 | 36.8% 3033<br>26.4% LD701<br>36.8% 0585 |
| DOSE | Mrad | 0.0 | 0.0 | 0.0 |
| GAUGE | mil | 2.1 | 2.35 | 2.27 |
| TENSILE STRENGTH, MD/TD | psi | 13900/13100 | 13845/14543 | 13213/16193 |
| E@BREAK, MD/TD | % | 224/194 | 283/230 | 292/315 |
| SHRINK @ 90 C., MD/TD | % | 47/49 | 51/50 | 51/54 |
| DYNAMIC PUNCTURE | cmkg/mil | 2.1 | 6.17 | 6.98 |
| HAZE | % | 8.6 | 2.8 | 1.8 |
| GLOSS | h.u. | 74.0 | 87.6 | 90.0 |

TABLE Q

Irradiated Three Layer Films — Small Scale.

| | | SAMPLE | | |
|---|---|---|---|---|
| | Units | 34 | 35 | 36 |
| FORMULATION OF OUTER LAYERS | Weight | 25.8% XU61520.01<br>39.7% LD701<br>34.5% 4011 | 36.8% PL1880<br>26.4% LD701<br>36.8% 0585 | 36.8% 3033<br>26.4% LD701<br>36.8% 0585 |
| DOSE | Mrad | 3.75 | 4.0 | 4.0 |
| TENSILE STRENGTH, MD/TD | psi | 12370/12623 | 13195/12878 | 14508/14438 |
| E@BREAK, MD/TD | % | 218/207 | 229/284 | 205/234 |
| SHRINK @ 90 C., MD/TD | % | 48/51 | 47/48 | 52/50 |
| SHRINK FORCE @ 90 C., MD/TD | g/mil | 133/146 | 140/121 | 153/113 |
| DYNAMIC PUNCTURE | cmkg/mil | 2.3 | 5.38 | 9.41 |
| HAZE | % | 6.4 | 2.7 | 2.1 |
| GLOSS | h.u. | 81.8 | 86.7 | 90.0 |

What is claimed is:

1. A heat shrinkable, puncture resistant biaxially stretched thermoplastic film suitable for use in fabricating bags for packaging food articles comprising a polyethylene which is a linear copolymer of ethylene and an alpha olefin containing from 4 to 8 carbon atoms, having a density between about 0.88 and about 0.905 g/cm$^3$, a melt index not exceeding about 1.5 g/10 min, a molecular weight/size distribution ratio Mw/Mn not exceeding about 3, a melting point not exceeding about 102° C., a Young's Modulus not exceeding about 850 kg/cm$^2$, and wherein said film shrinks at least about 45 percent at a temperature of about 90° C. in at least one of the machine and transverse directions.

2. A film according to claim 1 wherein said film is a monolayer film.

3. A film according to claim 1 wherein said film is a multilayer film and said linear copolymer comprises at least one layer of said film.

4. A film according to claim 1 wherein said film is a multilayer film including an oxygen barrier core layer comprising an oxygen barrier material with at least one other layer on each side thereof, and said linear copolymer comprises at least one of said other layers.

5. A film according to claim 4 wherein the oxygen barrier-core layer is a copolymer of vinylidene chloride.

6. A film according to claim 5 wherein the oxygen barrier-core layer is vinylidene chloride-vinyl chloride copolymer.

7. A film according to claim 5 wherein the oxygen barrier-core layer is vinylidene chloride-methyl acrylate.

8. A film according to claim 4 wherein the oxygen barrier-core layer is hydrolyzed ethylene vinyl acetate.

9. A film according to claim 1 comprising a blend of said linear copolymer and at least one other thermoplastic polymer.

10. A film according to claim 9 wherein said other thermoplastic polymer is another ethylene alpha olefin copolymer.

11. A film according to claim 10 wherein said another ethylene alpha olefin copolymer is a metallocene single site catalyzed copolymer.

12. A film according to claim 11 wherein said metallocene single site catalyzed copolymer is a linear copolymer of ethylene and an alpha olefin containing from 4 to 8 carbon atoms having a density between about 0.88 and about 0.905 g/cm$^3$, a melt index not exceeding about 1.5 g/10 min, a molecular weight/size distribution ratio Mw/Mn not exceeding about 3, a melting point not exceeding about 100° C., and a Young's Modulus not exceeding about 850 kg/cm$^2$.

13. A film according to claim 9 wherein said other thermoplastic polymer is ethylene vinyl acetate.

14. A film according to claim 10 wherein said blend, in addition to said linear copolymer and said another ethylene alpha olefin copolymer, comprises ethylene vinyl acetate.

15. A film according to claim 1 wherein said linear copolymer has a Vicat softening point not exceeding about 70° C.

16. A film according to claim 1 wherein said linear copolymer is a butene copolymer having density of about 0.88 g/cm$^3$, melt index of about 0.5 g/10 min, an Mw value of about 190,000, an Mn value of about 92,600, a melting point of about 67° C., a Young's Modulus of about 400 kg/cm$^2$, a dynamic puncture value of about 11.5 cmkg/mil, and a Vicat softening point of about 62° C.

17. A film according to claim 1 wherein said linear copolymer is a butene-hexene terpolymer having density of about 0.900 g/cm$^3$, a melt index of about 1.2 g/10min, an Mw value of about 92,000, and Mn value of about 50,000, a melting point of about 94° C., a Young's Modulus of about 773 kg/cm$^2$, and a Vicat softening point of between about 75° C. to about 83° C.

18. A film according to claim 11, wherein said metallocene single site catalyzed copolymer is a butene-hexene terpolymer having a density of about 0.900 g/cm$^3$, a melt index of about 1.2 g/10 min, an Mw value of about 92,000, an Mn value of about 50,000, a melting point of about 94° C., a Youngs Modulus of about 773 kg/cm$^2$, and a Vicat softening point between about 75° C. to about 83° C.

19. A film according to claim 1 which is crosslinked.

20. A film according to claim 1 which is crosslinked by irradiation.

21. A film according to claim 1 which shrinks at least about 55 percent in both the machine and traverse directions at 90° C.

22. A film according to claim 16 comprising three layers including an oxygen barrier-core layer of a vinylidene chloride-methyl acrylate copolymer and an outer layer on each side of said barrier-core layer, each of said outer layers comprising a blend of between about 65 and about 75 wt % of said linear copolymer and between about 20 and about 30 wt % ethylene vinyl acetate, and said film being crosslinked by irradiation and shrinks at least about 55 percent in both the machine and transverse directions at 90° C.

23. A film according to claim 2 having dynamic puncture strength of at least about 10 cmkg/mil.

24. A film according to claim 22 having dynamic puncture strength of at least about 3 cmkg/mil.

25. A film according to claim 14 wherein said linear copolymer comprises between about 30 and about 40 wt. % of said blend, said ethylene vinyl acetate comprises between about 20 and about 30 wt. % of said blend and said another ethylene alpha olefin copolymer comprises between about 30 and about 40 wt. % of said blend.

26. A film according to claim 12, wherein said blend, in addition to said linear copolymer and said metallocene single site catalyzed copolymer, comprises ethylene vinyl acetate.

27. A film according to claim 26, wherein said linear copolymer comprises between about 30 and about 40wt % of said blend, said ethylene vinyl acetate comprises between about 20 and about 30 wt. % of said blend and said metallocene single site catalyzed copolymer comprises between about 30 and about 40 wt. % of said blend.

* * * * *